United States Patent
Zhang et al.

(10) Patent No.: US 8,982,910 B1
(45) Date of Patent: Mar. 17, 2015

(54) FIXED GENERIC MAPPING OF CLIENT DATA TO OPTICAL TRANSPORT FRAME

(75) Inventors: Qian Zhang, Kanata (CA); Mohammed Tatar, Kanata (CA); Gary Nicholl, Kanata (CA); Tim Webster, Kanata (CA); Christopher Chan, Kanata (CA)

(73) Assignee: Cisco Technology, Inc., San Jose, CA (US)

(*) Notice: Subject to any disclaimer, the term of this patent is extended or adjusted under 35 U.S.C. 154(b) by 551 days.

(21) Appl. No.: 13/079,833

(22) Filed: Apr. 5, 2011

(51) Int. Cl.
H04J 3/06 (2006.01)
H04L 12/931 (2013.01)

(52) U.S. Cl.
CPC ........................................ *H04L 49/00* (2013.01)
USPC ........................................................... 370/503

(58) Field of Classification Search
None
See application file for complete search history.

(56) References Cited

U.S. PATENT DOCUMENTS

| | | | |
|---|---|---|---|
| 6,347,096 B1 * | 2/2002 | Profumo et al. | 370/476 |
| 6,937,568 B1 | 8/2005 | Nicholl et al. | |
| 7,424,037 B2 * | 9/2008 | Imazeki et al. | 370/474 |
| 8,189,623 B2 * | 5/2012 | Paranjape et al. | 370/503 |
| 8,274,892 B2 * | 9/2012 | Chiang et al. | 370/235 |
| 2004/0156390 A1 | 8/2004 | Prasad et al. | |
| 2006/0233194 A1 | 10/2006 | Loprieno | |

OTHER PUBLICATIONS

International Telecommunication Union, ITU-T, Telecommunication Standardization Sector of ITU, "Interfaces for the Optical Transport Network (OTN)," printed in Geneva, Switzerland, 2010.

* cited by examiner

*Primary Examiner* — Ayaz Sheikh
*Assistant Examiner* — Blanche Wong
(74) *Attorney, Agent, or Firm* — Edell, Shapiro & Finnan, LLC (57) ABSTRACT

A fixed Generic Mapping Procedure (GMP) apparatus and method are provided to map client data to an optical transport frame. Client data to be mapped into a payload field of an optical transport frame is received and store in a memory. Timing information is generated based on bit and fractional bit granularity of client data mapped into the payload field of successive optical transport frames for use in recovering the client data from received optical transport frames.

21 Claims, 6 Drawing Sheets

FIXED GENERIC MAPPING OF CLIENT DATA TO OPTICAL TRANSPORT FRAME

TECHNICAL FIELD

The present disclosure relates to mapping signals into frames for transport in an optical transport network.

BACKGROUND

Optical transport networks are used to transport data in long-range service provider networks. ITU-T Recommendation G-709 provides standardized requirements for operations, administration, maintenance, and provisioning functionality. The G-709 standard specifies a method for encapsulating an existing frame of data, regardless of the native protocol. The encapsulation of the data is flexible in terms of frame size and allows multiple existing frames of data to be wrapped together into a single entity that can be more efficiently managed through a lesser amount of overhead in a multi-wavelength system.

When transmitting data from a client device in the optical transport network, the client data stream needs to be mapped into a payload field of an optical transport network frame.

DESCRIPTION OF EXAMPLE EMBODIMENTS

Overview

A fixed Generic Mapping Procedure (GMP) apparatus and method are provided to map client data to an optical transport frame. Client data to be mapped according to a fixed mapping procedure into a payload field of an optical transport frame is received and stored in a memory. Timing information is generated based on bit and fractional bit granularity of client data mapped into the payload field of successive optical transport frames, the timing information to be included in an overhead field of the optical transport frames for use in recovering the client data from received optical transport frames.

Example Embodiments

Figure 1:
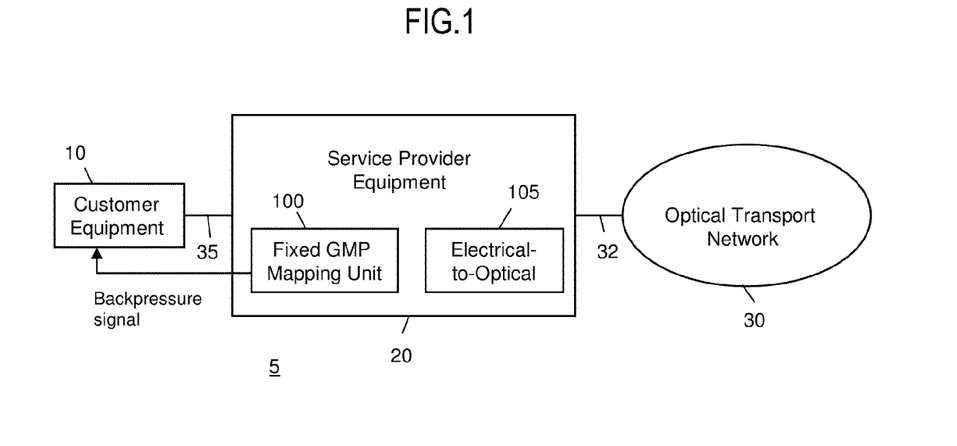
FIG. 1 is a block diagram showing an example of a network environment in which a fixed Generic Mapping Procedure (GMP) unit is deployed.

Referring first to FIG. 1, a network environment 5 is shown consisting of a customer equipment 10, service provider equipment 20 and an optical transport network 30. The customer equipment 10 may comprise computing equipment, such as server computers, personal computers, etc., connected on a local area network, which is connected by a network connection 35 to service provider equipment 20. The data sent from the customer equipment to the service provider equipment 20 is referred to herein as "client data" and it may include any type of data. For example, the client data is 100 Gigabit/s Ethernet data.

The service provider equipment 20 converts the client data, which is in the form of digital electrical signals, to optical signals for transport across the optical transport network 30. To this end, the service provider equipment 20 comprises a fixed Generic Mapping Procedure (GMP) unit 50 and an electrical-to-optical transmitter 105. In order to transport the client data across the optical transport network 30, it is first mapped into a particular format, e.g., the format specified for ITU-T Recommendation G-709. The electrical-to-optical transmitter 105 then converts the formatted data in what is called an Optical Transport Unit (OTU) frame to optical signals for transport across the optical transport network 30. The link 32 between the service provider equipment 20 and the optical transport network 30 is an optical link.

ITU-T G.709 Annex D defines GMP as a generic algorithm to map a Constant Bit Rate (CBR) client data stream into an Optical Payload Unit (OPU) field of an OTU frame. In applications where CBR client traffic is sourced or terminated, the CBR traffic can be rate-locked to the OPU rate, resulting in "Fixed-GMP" mapping of the client data stream into the OPU field. The principle of Fixed-GMP is to predetermine (through configuration) how many bits or fractional bits of client data are mapped into one OPU field. Given that a server rate (associated with the server provider equipment 30) is predetermined for a transport node, the client data rate can be fixed through programming. The server rate is also referred to herein as the OPU rate. The fixed GMP unit 100 generates accurate and configurable client timing information for the payload overhead bytes by taking into account client data bit and fractional bit timing granularity. The client data is mapped into the OTN payload according to the fixed GMP algorithm. The fixed GMP algorithm is G.709 compliant. The fixed GMP unit 20 also provides a "Backpressure signal" to the customer equipment 10 to ensure that the data is supplied to the fixed GMP unit 100 to feed the mapping algorithm in order to fill the OPU field from frame to frame to satisfy a desired rate of the optical transport frames.

Figure 2:
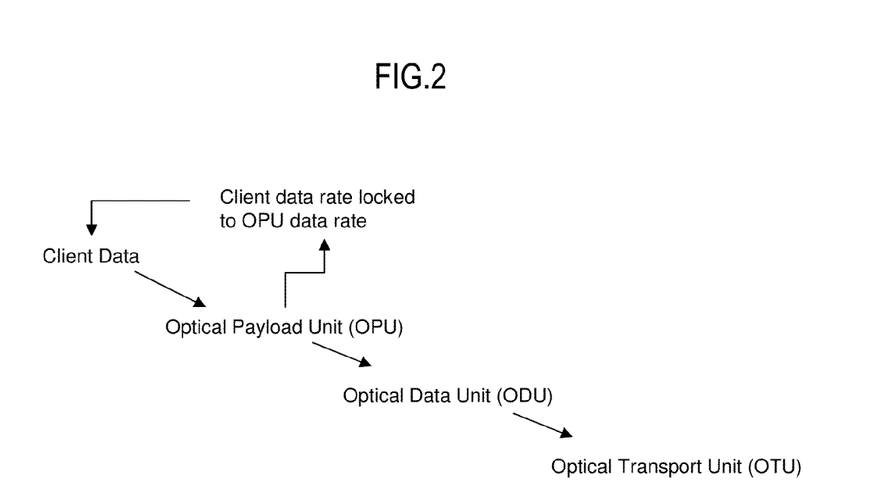
FIG. 2 is a diagram generally depicting an example of a data flow for which the fixed GMP unit is used.

Reference is now made to FIG. 2 for a general description of the operation of the fixed GMP unit 100. As shown in FIG. 2, the client data is mapped into an OPU field, which is in turn mapped into an Optical Data Unit (ODU) frame and which is in turn mapped into an OTU frame that is ultimately converted to optical signals for transport across the optical transport network. The client data rate is locked to the OPU data rate as indicated in FIG. 2. The GMP techniques described herein are applicable to all GMP applications where the client data rate can be locked to OPU data rate. The accuracy in terms of parts per million (ppm) can be as small as desired, by expanding fractional bit recording, as described herein.

Figure 3:
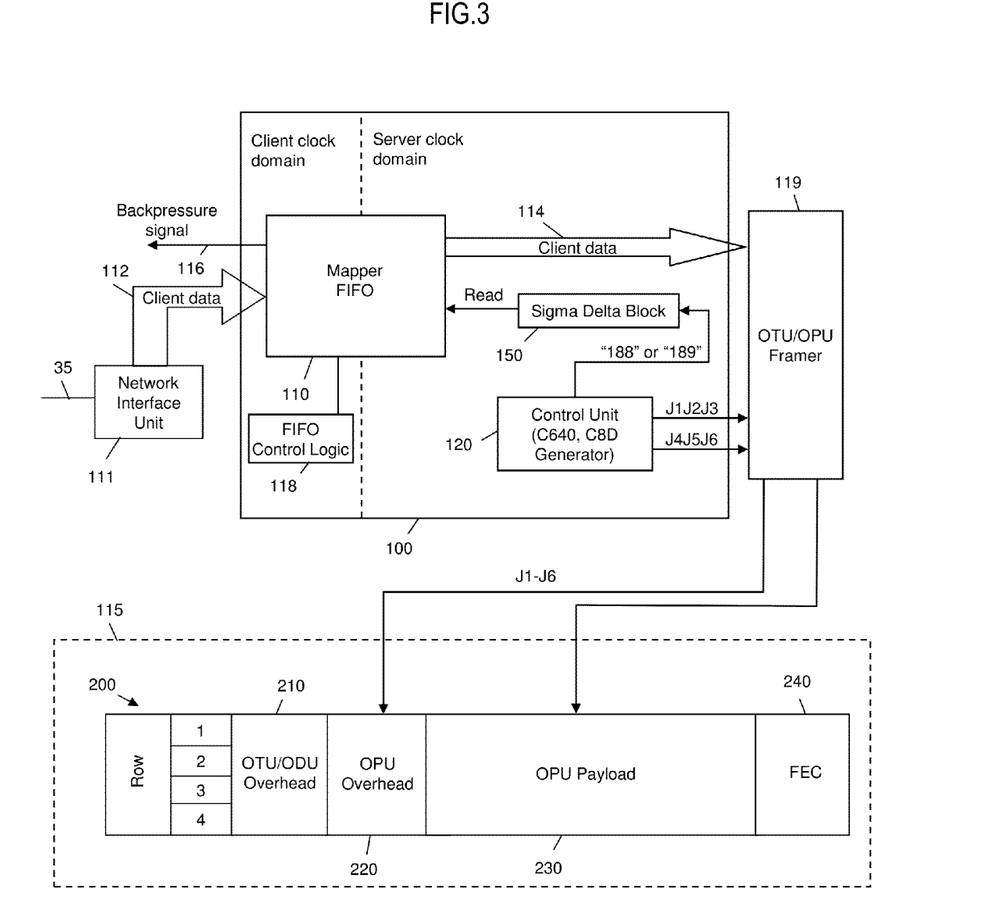
FIG. 3 is block diagram of an example of the fixed GMP unit.

Reference is now made to FIG. 3 for a description of a block diagram of the fixed GMP unit 100. The fixed GMP unit 100 includes a mapper first-in first-out (FIFO) 110, a control unit 120 and a sigma delta block 150. The mapper FIFO 110 is a memory device that is configured for FIFO storage of client data to be mapped into an OPU of an OTU frame. The client data is shown at 112 as input to the mapper FIFO 110 and this data is in the client clock domain as depicted in FIG. 3. A network interface device 111 connects to the network connection 35 to receive the client data from the customer equipment 10. The client data output from the mapper FIFO 110 is shown at 114 and is in the server or OPU clock domain. The control unit 120 is configured to generate timing information based on bit and fractional bit timing granularity of client data mapped into the payload field of successive optical transport frames. The timing information is to be included in an overhead field of the optical transport frames for use in recovering the client data from received optical transport frames. As described hereinafter in connection with FIGS. 4 and 5, the control unit comprises inputs for generating the timing information according to each of the number of bytes, single bits and fractional bits of client data mapped according to the fixed mapping procedure into the payload field of successive optical transport frames.

FIG. 3 also shows how the outputs from the fixed GMP unit 100 are mapped into an OTU frame 200. Data is read out from the mapper FIFO 114 and mapped into the OTU frame 200 within a memory 115 that serves as a buffer before the OTU frame 200 is supplied to the electrical-to-optical transmitter 105. A FIFO control logic circuit 118 is also provided to coordinate the writing of client data to the mapper FIFO 114. The OTU frame 200 comprises an OTU/ODU overhead field 210, an OPU overhead field 220, an OPU payload field 230 and a forward error correction (FEC) field 240. The fixed GMP unit 100 maps the client data 114 read out from the mapper FIFO 110 to the OPU payload field 230 and supplies overhead bytes J1J2J3 and J4J5J6, representing the aforementioned timing information, to the OPU overhead field 220. The overhead bytes J1J2J3 and J4J5J6 are named as such per the G-709 standard. An OTU/OPU framer module 119 is provided that receives the client data and the overhead bytes J1-J6 output from the fixed GMP unit 100 to generate and populate the fields of the OTU frame 200 and ultimately supply the OTU formatted data to the electrical-to-optical transmitter 105.

Fixed GMP does not adapt OPU payload rate to the client data rate. As a result, the client incoming traffic needs to be higher than a predetermined fixed rate. Accordingly, the Backpressure signal 116 is sent to customer equipment (client device) 10 to throttle the client data rate. As mentioned above, the Backpressure signal is a signal that is generated by the fixed GMP unit and supplied to the customer equipment 10 to ensure that data from the customer equipment 10 is filling the mapper FIFO sufficiently to keep up with filling of an OPU field at the desired OPU payload rate.

A fixed-GMP mapped OPU frame is ITU-T G-709 compliant. It can interoperate with any G-709 compliant receiver. Described herein is an example in which 100 Gigabit Ethernet (GE) mapping is made into an OPU4 frame of an OTU4 frame. This is only an example and is not meant to be limiting and can be used with other data rates, such as 40 G.

The control unit 120 is a "C640,C8D generator" that generates a first control referred to herein as "C640" and a second control referred to herein as "C8D" once per frame compliant to the G-709 definition. The C640 control is a number that is range bound between "188" and "189" and represents the number of blocks of a predetermined number of bytes, (e.g., 80 bytes) to be mapped to an optical transport frame, i.e., either 188 80 byte blocks or 189 80 byte blocks of client data. The C8D control is a number that represents a residual number of bytes between 0 and 79, that are residual or a portion of an 80 byte block. A byte is, for example, 8 bits. The C640 control is used to encode J1J2J3 bytes in the OPU overhead field 220 and also used to read client data from mapper FIFO 110. The C8D control is encoded in J4J5J6 bytes in the OPU overhead field 220. The sigma delta block 150 spreads data in the OPU payload field 230 according to the G-709 standard.

All of the components of the fixed GMP unit 100 may be implemented with digital logic gates in an Application Specific Integrated Circuit (ASIC). Alternatively, there may be applications where the functions of these circuits are implemented in software stored in a memory device and, when executed by a processor, cause the processor to perform the operations described herein. An example of a software implementation of the fixed GMP unit 100 is described hereinafter in connection with FIGS. 6 and 7.

Figure 4:
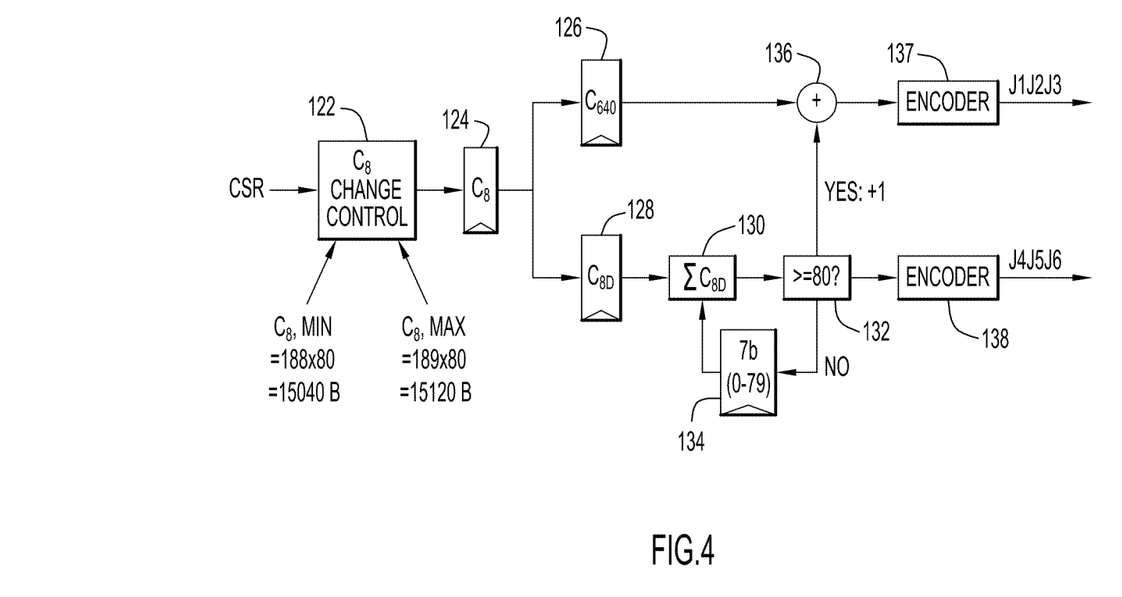
FIG. 4 is a block diagram showing an example of the digital logic for a control unit of the fixed GMP unit.

Reference is now made to FIG. 4 for a further description of the control unit 120. The control unit 120 comprises a $C_8$ change control circuit 122 that determines the number of client bytes to be sent in the next OTU frame. There is a plurality of data storage units, e.g., flip-flops, that are used to store client data accumulated across OTU frames. Storage unit 124 labeled "$C_8$" is coupled to the output of change control circuit 122 to receive data (a value) representing the number of bytes output from the change control circuit 122. The contents of storage unit 124 is divided into two parts: data representing a number of blocks (each comprising a predetermined number of bytes, e.g., 80 bytes) also referred to as the "integer part" that is stored in storage unit 126 labeled $C_{640}$, and data representing a number of residual bytes (less than the predetermined number, e.g., between 0 and 79) that is stored in storage unit 128 labeled "$C_{8D}$."

As indicated in FIG. 4, the value $C_8$ is bounded by a minimum value of 188 (corresponding to 15040 bytes for 80 byte blocks) and 189 (corresponding to 15120 for 80 byte blocks). Client data needs to be built up over time corresponding to successive OTU frames in the mapper FIFO 110 before it can be written into an OTU frame in order to satisfy the parameters of the frame, e.g., blocks of 80 bytes, where each byte comprises 8 bits. An accumulator 130 is coupled to the output of storage unit 128, and is in turn coupled to a comparator 132. The comparator 132 compares the output of the accumulator 130 to determine whether it is greater than or equal to the predetermined number of bytes, e.g., 80. When the output of accumulator 130 is less than the predetermined number, e.g., 80, the comparator 130 generates an output that is supplied to a storage unit 134 (e.g., a flip-flop) that is in turn coupled to the accumulator 130. The contents of storage unit 128 is accumulated from frame to frame. An adder 136 is provided that is coupled to an output of the comparator 132. When an accumulated value of the accumulator 130 is equal to or greater than the predetermined number (e.g., 80), the comparator 132 generates an output to the adder 136 to increment by one the contents of storage unit 126. To summarize, the accumulator circuit 130 is configured to accumulate values representing the residual over successive optical transport frames and the comparator 132 is configured to generate an output when the accumulation is equal to or greater than the predetermined number, e.g., 80.

A first encoder 137 is coupled to the output of the adder 136 and is configured to encode a first set of OPU overhead bytes J1J2J3 that represents the number of 80 byte blocks (188 or 189) to be mapped to an OPU payload field. A second encoder 138 is coupled to an output of the comparator 132 and is configured to encode a second set of OPU overhead bytes J4J5J6 that represents a residual number of bytes (0-79) to be mapped to an OPU field.

Figure 5:
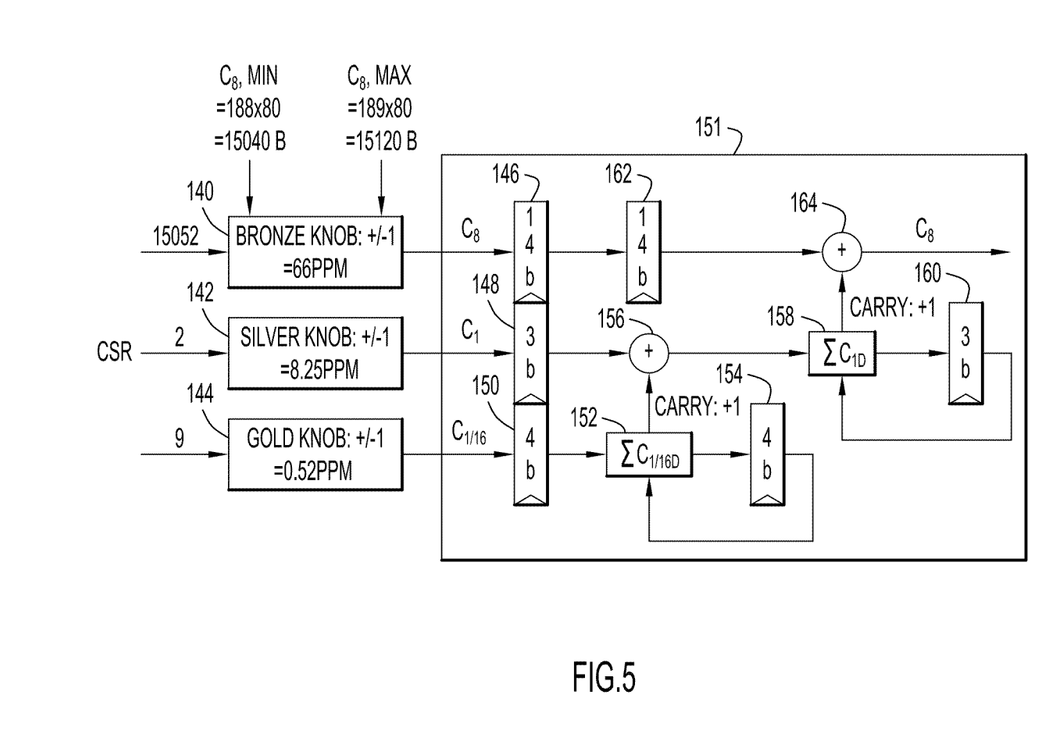
FIG. 5 is a block diagram showing an example of the digital logic for a change control circuit that is part of the control unit of the fixed GMP unit.

FIG. 5 illustrates the change control circuit 122 in detail. The change control circuit 122 includes three control inputs or knobs 140, 142 and 144, corresponding storage units 146, 148 and 150 and associated accumulation and carry circuitry 151 described hereinafter. The control input 140 is referred to as a "Bronze knob" in which +/−1 represents a relatively coarse level of change, e.g., 66 ppm, of client data rate with respect to server (OPU) data rate. The control input 142 is referred to as a "Silver knob" in which +/−1 represents a medium or relatively moderate level of change, e.g., 8.25 ppm, of client data rate with respect to server rate. The control input 144 is referred to as a "Gold knob" in which +/−1 represents a relatively fine level of change, e.g., 0.52 ppm, of client rate with respect to server rate.

The values supplied to the control inputs 140, 142 and 144 are for $C_8$, $C_1$ and $C_{1/16}$, respectively, which represent how many 8 bits, single bits (1 bit) and ⅟₁₆ bit, respectively, of client data are mapped into one OPU frame. The storage unit 146 stores the programmed value for $C_8$, the storage unit 148 stores the programmed value for $C_1$ and the storage unit 150 stores the programmed value for $C_{1/16}$. The storage units 146, 148 and 150 are flip-flops, for example.

The values for $C_8$, $C_1$ and $C_{1/16}$ are supplied to accumulation and carry circuitry 151 that performs an accumulation and carry scheme. The accumulation and carry circuitry 151 is now described. An accumulator 152 is coupled to the output of the storage unit 150 and a storage unit 154 is coupled to the output of the accumulator 152. An adder 156 is coupled to the output of the storage unit 148. The adder 156 receives an input from the storage unit 148 and from a carry output of the accumulator 152. An accumulator 158 is coupled to the output of the adder 156 and a storage unit 160 is coupled to the output of the accumulator 158. An adder 164 is coupled to the output of storage unit 162 and receives an input from the storage unit 162 and from a carry output of the accumulator 158.

In operation, $C_{1/16}$ is accumulated over successive OTU frames by the accumulator 152 and storage unit 154. When the accumulation exceeds one, the accumulator 152 generates a carry output to increment $C_1$ by one. A similar process occurs for $C_1$. $C_1$ is accumulated over successive OTU frames by the accumulator 158 and storage unit 160. When the accumulation exceeds eight, the accumulator 158 generates a carry output to increment $C_8$ by one at the adder 164. The value for $C_8$ is then taken at the output of the adder 164, and is supplied as input to the storage unit 124 shown in FIG. 4. As an example, when the values for $C_8$, $C_1$ and $C_{1/16}$, are $C_8=15052$, $C_1=2$, $C_{1/16}=9$, the 100GE client rate is −0.2755 ppm lower than the nominal 100 GE OPU (server) rate.

The circuitry shown in FIG. 5 comprises digital logic that is configured to receive the control inputs (comprising values for $C_8$, $C_1$ and $C_{1/16}$), and to accumulate fractional bits over successive optical transport frames, accumulate single bits over successive optical transport frames and generate a carry over from the accumulated single bits to increment a value representing the number of bytes to be sent a next optical transport frame.

Figure 6:
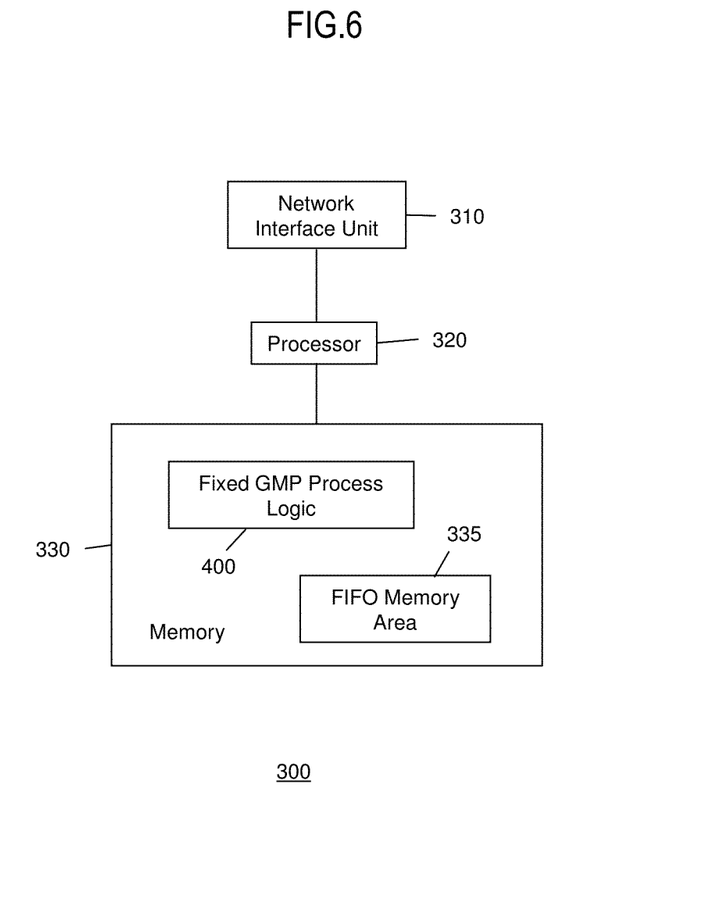
FIG. 6 is a block diagram for an example in which the operations of the fixed GMP unit are implemented in software.

As explained above, the fixed GMP unit 100 may be implemented with digital logic gates in an ASIC, as one example. In another example, the operations of the fixed GMP unit 100 may be implemented in software. Reference is now made to FIG. 6 for a description of a device that is configured to perform in software the operations associated with the fixed GMP unit 100. The device, shown at reference numeral 300, is for example a computing device or network device with computing capabilities. The device 300 comprises a network interface unit 310, a processor 320 and a memory 330. The network interface unit 320 is an Ethernet interface device or switch that enables communication over a network in order to receive client data from client equipment. The processor 320 is a microprocessor or microcontroller that performs a variety of operations or functions by executing software stored in the memory 330. For example, the memory 330 stores software instructions for fixed GMP process logic 400.

The memory 330 may comprise read only memory (ROM), random access memory (RAM), magnetic disk storage media devices, optical storage media devices, flash memory devices, electrical, optical, or other physical/tangible memory storage devices. In general, the memory 330 may comprise one or more computer readable storage media (e.g., a memory device) encoded with software comprising computer executable instructions and when the software is executed (by the processor 320) it is operable to perform the operations described herein in connection with process logic 400. There is also FIFO memory area 335 in the memory 330. The memory area 335 can be used to perform the functions of the mapper FIFO 110 shown in FIG. 1.

Figure 7:
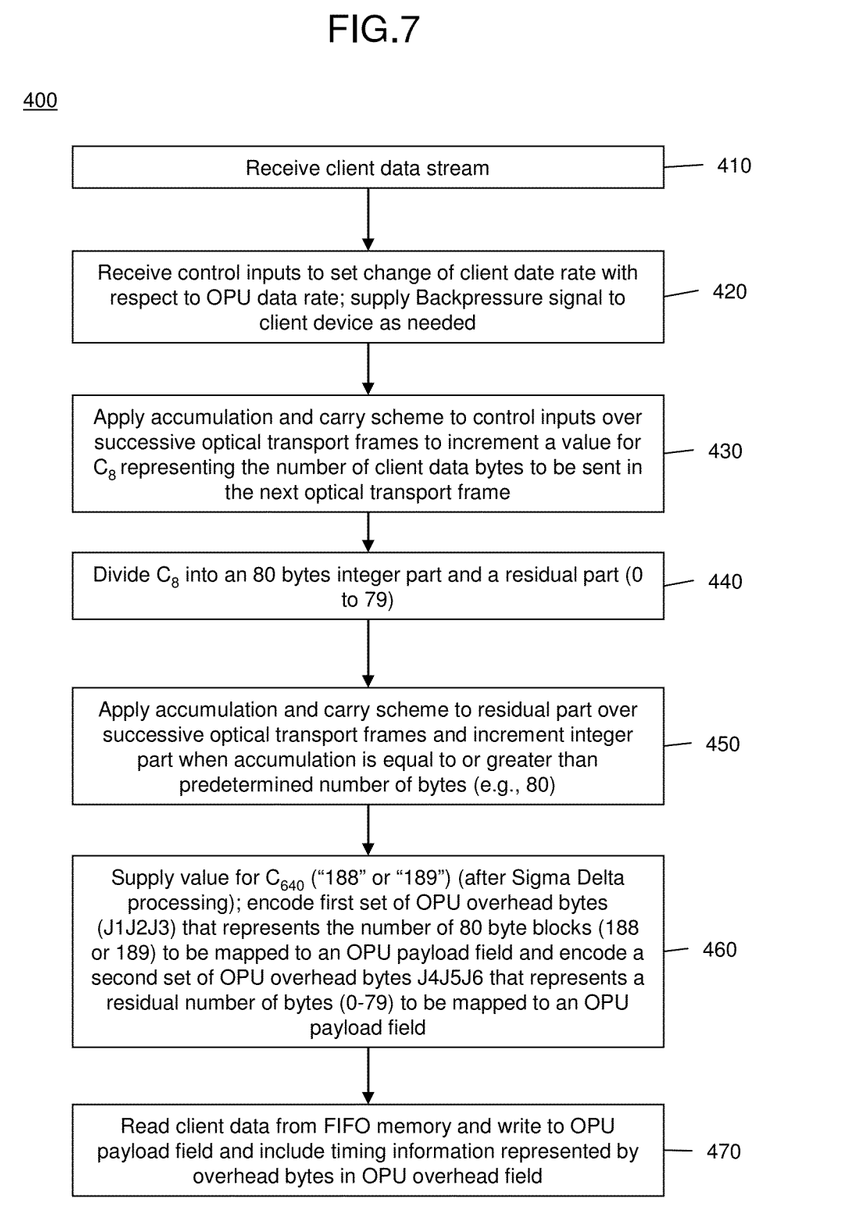
FIG. 7 is a flow chart showing examples of operations associated the implementation of the fixed GMP unit depicted in FIG. 6.

With reference to FIG. 7, operation of the process logic 400 is now described. At 410, a client data stream is received and stored in a FIFO memory. At 420, control inputs are received to set the change of client data rate with respect to the OPU data rate. This operation corresponds to receiving inputs for the control knobs for $C_{1/16}$, $C_1$ and $C_8$ described above in connection with FIG. 5, and the control inputs are used for generating timing information according to each of the number of fractional bits, single bits and bytes, respectively, of client data mapped into the payload field of successive optical transport frames. In addition, at 420, the Backpressure signal is supplied to the client device in order to request additional client data in order to keep the FIFO properly filled to maintain the desired OPU data rate. At 430, values are stored for each of the number of bytes, single bits and fractional bits received as control inputs $C_8$, $C_1$ and $C_{1/16}$, and an accumulation and carry scheme is applied to the control inputs over successive optical transport frames to generate a carry over from the accumulated single bits in order to increment the value ($C_8$) representing the number of client data bytes to be sent in the next OPU frame. This corresponds to the operations described above in connection with FIG. 5.

At 440, the value for $C_8$ representing the number of bytes is divided into an integer part ($C_{640}$) representing the number of blocks each comprising a predetermined number of bytes, (e.g., 80 bytes) and a residual part ($C_8D$) representing a residual number of bytes less than the predetermined number of bytes. At 450, an accumulation and carry scheme is performed to accumulate the value representing the residual over successive optical transport frames and to increment a value representing the integer part when the value representing the residual exceeds the predetermined number, e.g., 80. Operations 440 and 450 correspond to the operations described above in connection with FIG. 4. At 460, a value for $C_{640}$ (either "188" or "189"), after Sigma Delta processing, is supplied to read data out from the FIFO memory 335 referred to above in connection with operation 410. In addition, at 460, a first set of OPU overhead bytes (J1J2J3) is encoded representing the number of 80 byte blocks to be mapped to an OPU field, and a second set of OPU overhead bytes representing a residual number of bytes to be mapped to the OPU field. At 470, client data is read from the FIFO memory and written to the OPU payload field, and the timing information, represented by the J1-J6 overhead bytes, are included in the OPU overhead field.

In summary, operation 410 involves storing client data in a memory to be mapped according to a fixed mapping procedure into a payload field of an optical transport frame, operations 420-460 involve generating timing information based on bit and fractional bit timing granularity of client data mapped into the payload field of successive optical transport frames, and operation 470 involves including (writing) the timing information in the overhead field of the optical transport frames for use in recovering the client data from received optical transport frames.

In one form, an apparatus is provided comprising a memory configured for first-in-first-out storage of client data to be mapped according to a fixed mapping procedure into a payload field of an optical transport frame; and a control unit configured to generate timing information based on bit and fractional bit timing granularity of client data mapped into the payload field of successive optical transport frames, the timing information to be included in an overhead field of the optical transport frames for use in recovering the client data from received optical transport frames, the timing information to be included in an overhead field of the optical transport frames for use in recovering the client data from received optical transport frames.

In addition, a method is provided comprising storing client data in a memory to be mapped according to a fixed mapping procedure into a payload field of an optical transport frame; and generating timing information based on bit and fractional bit timing granularity of client data mapped into the payload field of successive optical transport frames; and including the timing information in an overhead field of the optical transport frames for use in recovering the client data from received optical transport frames.

Further still, one or more computer readable storage media encoded with software comprising computer executable instructions and when the software is executed operable to: store client data in a memory to be mapped according to a fixed mapping procedure into a payload field of an optical transport frame; generate timing information based on bit and fractional bit timing granularity of client data mapped into the payload field of successive optical transport frames; and include the timing information in an overhead field of the optical transport frames for use in recovering the client data from received optical transport frames.

The above description is intended by way of example only.

What is claimed is:

1. An apparatus comprising:
a memory configured for first-in-first-out storage of client data received at a client data rate;
a framer configured to map the client data into payload fields of successive optical transport frames according to a fixed mapping procedure in which the client data rate is rate-locked to an optical payload unit rate; and
a control unit configured to generate timing information based on bit and fractional bit timing granularity of how the client data is mapped into the payload fields of successive optical transport frames, the timing information to be included in an overhead field of the successive optical transport frames for use in recovering the client data from the successive optical transport frames when received at a device.

2. The apparatus of claim 1, wherein the control unit comprises control inputs for generating the timing information according to each of a number of bytes, single bits and fractional bits of the client data mapped according to the fixed mapping procedure into the payload field of successive optical transport frames.

3. The apparatus of claim 2, wherein the control unit comprises first, second and third storage units, wherein the first storage unit receives data representing the number of bytes and an output of the first storage unit is coupled to inputs of the second and third storage units, respectively, and wherein the second storage unit stores data representing a number of blocks each comprising a predetermined number of bytes, and the third storage unit stores data representing a number of residual bytes less than the predetermined number of bytes.

4. The apparatus of claim 3, and further comprising a comparator circuit and an accumulator circuit having a first input coupled to an output of the third storage unit and a second input coupled to an output of the comparator, and wherein the accumulator circuit is configured to accumulate the values representing the residual over successive optical transport frames and the comparator is configured to generate an output when the accumulation is equal to or greater than the predetermined number of bytes.

5. The apparatus of claim 4, and further comprising an adder having a first input coupled to the output of the comparator and a second input coupled to an output of the second storage unit, and wherein the adder is configured to increment by one the content of the second storage unit when the accumulated value of the accumulator circuit is equal to or greater than the predetermined number of bytes.

6. The apparatus of claim 5, and further comprising a first encoder coupled to an output of the adder and a second encoder coupled to the output of the comparator, wherein the first encoder is configured to encode a first set of overhead bytes that represents the number of blocks of bytes and the second encoder is configured to encode a second set of overhead bytes that represents the residual.

7. The apparatus of claim 6, wherein the control unit comprises digital logic that is configured to receive the control inputs, and to accumulate fractional bits over successive optical transport frames, accumulate single bits over successive optical transport frames and generate a carry over from the accumulated single bits to increment a value representing the number of bytes to be sent a next optical transport frame.

8. The apparatus of claim 7, wherein the control unit is configured to receive control inputs representing each of a coarse level of change, a moderate level of change and a fine level of change, of client data rate with respect to data rate of the optical transport frame, wherein the coarse level of change corresponds to the number of bytes of client data, the moderate level of change corresponds to the number of single bits of client data and the fine level of changes corresponds to the number of fractional bits of client data.

9. A method comprising:
storing client data received at a client data rate in a memory;
mapping the client data into payload fields of successive optical transport frames according to a fixed mapping procedure in which the client data rate is rate-locked to an optical payload unit rate;
generating timing information based on bit and fractional bit timing granularity of how the client data is mapped into the payload field of successive optical transport frames; and
including the timing information in an overhead field of the successive optical transport frames for use in recovering the client data from the successive optical transport frames when received at a device.

10. The method of claim 9, wherein generating comprises generating the timing information according to each of a number of bytes, single bits and fractional bits of the client data mapped according to the fixed mapping procedure into the payload field of successive optical transport frames.

11. The method of claim 10, and further comprising storing integer values representing each of the number of bytes, single bits and fractional bits received as control inputs, accumulating the integer values for the fractional bits and single bits over successive optical transport frames and generating a carry over from the accumulated single bits to increment an integer value representing a number of bytes to be sent in a next optical transport frame.

12. The method of claim 11, and further comprising dividing the value representing the number of bytes into an integer part representing a number of blocks each comprising a predetermined number of bytes and a residual part representing a residual number of bytes less than the predetermined number of bytes.

13. The method of claim 12, and further comprising accumulating a value representing the residual number of bytes over successive optical transport frames and incrementing a value representing the integer part when the value representing the residual part exceeds the predetermined number of bytes.

14. The method of claim 13, and further comprising encoding a first set of overhead bytes that represents the number of blocks of bytes and a second set of overhead bytes that represents the residual number of bytes, and writing the first and second set of overhead bytes into an overhead field of the optical transport frame.

15. The method of claim 9, and further comprising generating a signal supplied to a source of the client data to cause the source to supply client data in order to satisfy a desired rate of the optical transport frame.

16. One or more non-transitory computer readable storage media encoded with software comprising computer executable instructions and when the software is executed operable to:
    store client data received at a client data rate in a memory;
    map the client data into payload fields of successive optical transport frames according to a fixed mapping procedure in which the client data rate is rate-locked to an optical payload unit rate;
    generate timing information based on bit and fractional bit timing granularity of how the client data is mapped into the payload field of successive optical transport frames; and
    include the timing information in an overhead field of the successive optical transport frames for use in recovering the client data from the successive optical transport frames when received at a device.

17. The non-transitory computer readable storage media of claim 16, wherein the instructions operable to generate comprise instructions that are generate the timing information according to each of a number of bytes, single bits and fractional bits of the client data to be mapped according to the fixed mapping procedure into the payload field of successive optical transport frames.

18. The non-transitory computer readable storage media of claim 17, and further comprising instructions operable to store values for each of the number of bytes, single bits and fractional bits received as control inputs, accumulate values for the fractional bits and single bits over successive optical transport frames and generating a carry over from the accumulated single bits to increment the value representing a number of bytes to be sent in a next optical transport frame.

19. The non-transitory computer readable storage media of claim 18, and further comprising instructions operable to divide the value representing the number of bytes into an integer part representing a number of blocks each comprising a predetermined number of bytes and a residual part representing a residual number of bytes less than the predetermined number of bytes.

20. The non-transitory computer readable storage media of claim 19, and further comprising instructions operable to accumulate the value representing the residual over successive optical transport frames and increment a value representing the integer part when the value representing the residual exceeds the predetermined number of bytes.

21. The non-transitory computer readable storage media of claim 20, and further comprising instructions operable to encode a first set of overhead bytes that represents the number of blocks of bytes and a second set of overhead bytes that represents the residual number of bytes, and write the first and second set of overhead bytes into an overhead field of the optical transport frame.

\* \* \* \* \*